US011696195B2

(12) United States Patent
Zhang et al.

(10) Patent No.: US 11,696,195 B2
(45) Date of Patent: Jul. 4, 2023

(54) TECHNIQUES FOR DETERMINING A DELAY FOR DOWNLINK CONTROL INFORMATION BASED SECONDARY CELL ACTIVATION/DEACTIVATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 87 days.

(21) Appl. No.: 17/135,438

(22) Filed: Dec. 28, 2020

(65) Prior Publication Data
US 2021/0227432 A1 Jul. 22, 2021

Related U.S. Application Data

(60) Provisional application No. 62/962,718, filed on Jan. 17, 2020.

(51) Int. Cl.
*H04W 36/00* (2009.01)
*H04L 1/1607* (2023.01)
(Continued)

(52) U.S. Cl.
CPC ....... *H04W 36/0072* (2013.01); *H04L 1/1678* (2013.01); *H04L 5/0098* (2013.01);
(Continued)

(58) Field of Classification Search
CPC ......... H04W 36/0072; H04W 36/0058; H04W 36/0069; H04W 24/10; H04W 76/15;
(Continued)

(56) References Cited

U.S. PATENT DOCUMENTS

2021/0111851 A1\* 4/2021 Lin ................. H04L 5/0057
2022/0303811 A1\* 9/2022 Kakishima ............ H04W 16/28

OTHER PUBLICATIONS

3GPP TS 38.133 V16.2.0 (Dec. 2019), 3rd Generation Partnership Project; Technical Specification Group Radio Access Network; NR; Requirements for support of radio resource management (Release 16), 3GPP Standard; Technical Specification; 3GPP TS 38.133, 3rd Generation Partnership Project (3GPP), Mobile Competence Centre, 650, Route Des Lucioles, F-06921, Sophia-Antipolis Cedex, France, vol. RAN WG4. No. V16.2.0, Jan. 13, 2020 (Jan. 13, 2020), 1104 pages, XP051860731, Retrieved from the Internet: URL:http://ftp.3gpp.org/Specs/archive/38_series/38.133/38133-g20.zip 38133-g20_s0-11.docx [retrieved on Jan. 13, 2020] cited in the application, Section 8. Chapters 9.2-9.5.

(Continued)

*Primary Examiner* — Nam T Huynh
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive physical-layer control information indicating to activate or deactivate a secondary cell; and activate or deactivate the secondary cell within a time period in accordance with the physical-layer control information, wherein the time period is based at least in part on a set of factors and based at least in part on the secondary cell being activated or deactivated by the physical-layer control information. Numerous other aspects are provided.

30 Claims, 7 Drawing Sheets

(51) Int. Cl.
  *H04L 5/00*    (2006.01)
  *H04W 76/15*   (2018.01)
  *H04L 1/00*    (2006.01)

(52) U.S. Cl.
  CPC ... *H04W 36/0058* (2018.08); *H04W 36/0069* (2018.08); *H04W 76/15* (2018.02); *H04L 1/0026* (2013.01)

(58) Field of Classification Search
  CPC . H04W 16/32; H04W 56/001; H04W 84/045; H04L 1/1678; H04L 1/0026; H04L 1/1854; H04L 5/0098; H04L 5/0053; H04L 5/0048; H04L 5/001
  See application file for complete search history.

(56) References Cited

OTHER PUBLICATIONS

International Search Report and Written Opinion—PCT/US2020/067278—ISA/EPO—dated Apr. 26, 2021.
QUALCOMM Incorporated: "SCell Dormancy and Fast SCell Activation," 3GPP Draft, 3GPP TSG-RAN WG1 #99, R1-1912980, 3rd Generation Partnership Project (3GPP), Mobile Competence Centre, 650, Route Des Lucioles, F-06921, Sophia-Antipolis Cedex, France, vol. RAN WG1. No. Reno. USA; Nov. 18-2019-Nov. 22, 2019, Nov. 9, 2019 (Nov. 9, 2019), XP051823742, pp. 1-13, Retrieved from the Internet: URL:https://ftp.3gpp.org/tsg_ran/WG1_RL1/TSGR1_99/Docs/R1-1912980.zip R1-1912980 SCell dormancy and fast SCell activation.docx [retrieved on Nov. 9, 2019], the whole document.

\* cited by examiner

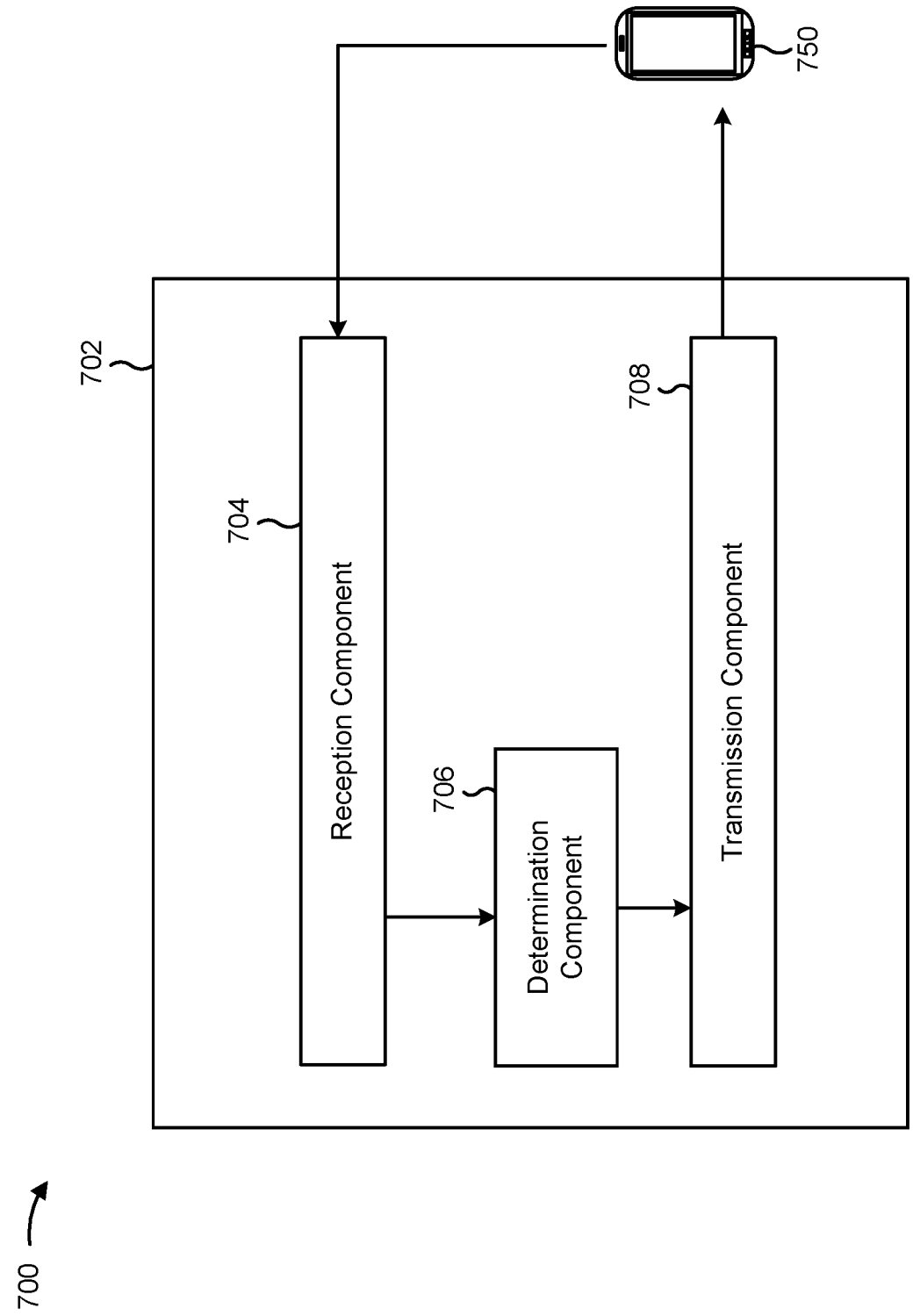

TECHNIQUES FOR DETERMINING A DELAY FOR DOWNLINK CONTROL
INFORMATION BASED SECONDARY CELL
ACTIVATION/DEACTIVATION

CROSS-REFERENCE TO RELATED
APPLICATION

This patent application claims priority to U.S. Provisional Patent Application No. 62/962,718, filed on Jan. 17, 2020, entitled "TECHNIQUES FOR DETERMINING A DELAY FOR DOWNLINK CONTROL INFORMATION BASED SECONDARY CELL ACTIVATION/DEACTIVATION," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for determining a delay for downlink control information (DCI) based secondary cell (SCell) activation/deactivation.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving physical-layer control information indicating to activate or deactivate a secondary cell; and activating or deactivating the secondary cell within a time period in accordance with the physical-layer control information, wherein the time period is based at least in part on a set of factors and based at least in part on the secondary cell being activated or deactivated by the physical-layer control information.

In a first aspect, the status is a known status, and the secondary cell is associated with the known status based at least in part on the UE having reported a measurement for a synchronization signal block (SSB) for the secondary cell within a time window, the SSB for which the measurement was reported remaining detectable within the time window, and an SSB serving as a quasi-colocation source for the measurement being detectable in the time period.

In a second aspect, alone or in combination with the first aspect, the set of factors includes a frequency range associated with the secondary cell.

In a third aspect, alone or in combination with one or more of the first and second aspects, the set of factors includes a hybrid automatic repeat request timing between receiving a downlink data transmission and acknowledging the downlink data transmission.

In a fourth aspect, alone or in combination with one or more of the first through third aspects, the set of factors includes whether the secondary cell is associated with Frequency Range 1 or Frequency Range 2.

In a fifth aspect, alone or in combination with one or more of the first through fourth aspects, the set of factors includes a time at which a first synchronization signal block is received after the physical-layer control information is received by the UE.

In a sixth aspect, alone or in combination with one or more of the first through fifth aspects, the set of factors includes respective synchronization signal/physical broadcast channel block measurement timing configurations of a serving cell of the UE and the secondary cell.

In a seventh aspect, alone or in combination with one or more of the first through sixth aspects, the set of factors includes a synchronization signal/physical broadcast channel block measurement timing configuration periodicity of the secondary cell.

In an eighth aspect, alone or in combination with one or more of the first through seventh aspects, the set of factors includes a measurement delay associated with a physical-layer measurement on the secondary cell.

In a ninth aspect, alone or in combination with one or more of the first through eighth aspects, the set of factors includes a slot length of the secondary cell.

In a tenth aspect, alone or in combination with one or more of the first through ninth aspects, activating or deactivating the secondary cell within the time period in accordance with the physical-layer control information further comprises at least one of transmitting a valid channel state information report within the time period, or performing one or more actions related to the physical-layer control information within the time period.

In some aspects, a method of wireless communication, performed by a base station, may include transmitting, to a UE, physical-layer control information indicating to activate or deactivate a secondary cell; and receiving a communication associated with activating or deactivating the secondary cell within a time period in accordance with the physical-layer control information, wherein the time period is based at least in part on a set of factors and based at least in part on the secondary cell being activated or deactivated by the physical-layer control information.

In a first aspect, the status is a known status, and the secondary cell is associated with the known status based at least in part on the UE having reported a measurement for an SSB for the secondary cell within a time window, the SSB for which the measurement was reported remaining detectable within the time window, and an SSB serving as a quasi-colocation source for the measurement being detectable in the time period.

In a second aspect, alone or in combination with the first aspect, the set of factors includes a frequency range associated with the secondary cell.

In a third aspect, alone or in combination with one or more of the first and second aspects, the set of factors includes a hybrid automatic repeat request timing between receiving a downlink data transmission and acknowledging the downlink data transmission.

In a fourth aspect, alone or in combination with one or more of the first through third aspects, the set of factors includes whether the secondary cell is associated with Frequency Range 1 or Frequency Range 2.

In a fifth aspect, alone or in combination with one or more of the first through fourth aspects, the set of factors includes a time at which a first synchronization signal block is received after the physical-layer control information is received by the UE.

In a sixth aspect, alone or in combination with one or more of the first through fifth aspects, the set of factors includes respective synchronization signal/physical broadcast channel block measurement timing configurations of a serving cell of the UE and the secondary cell.

In a seventh aspect, alone or in combination with one or more of the first through sixth aspects, the set of factors includes a synchronization signal/physical broadcast channel block measurement timing configuration periodicity of the secondary cell.

In an eighth aspect, alone or in combination with one or more of the first through seventh aspects, the set of factors includes a measurement delay associated with a physical-layer measurement on the secondary cell.

In a ninth aspect, alone or in combination with one or more of the first through eighth aspects, the set of factors includes a slot length of the secondary cell.

In a tenth aspect, alone or in combination with one or more of the first through ninth aspects, the communication associated with activating or deactivating the secondary cell within the time period in accordance with the physical-layer control information includes a valid channel state information report received within the time period.

In some aspects, a UE for wireless communication may include a memory and one or more processors operatively coupled to the memory. The memory and the one or more processors may be configured to receive physical-layer control information indicating to activate or deactivate a secondary cell; and activate or deactivating the secondary cell within a time period in accordance with the physical-layer control information, wherein the time period is based at least in part on a set of factors and based at least in part on the secondary cell being activated or deactivated by the physical-layer control information.

In a first aspect, the status is a known status, and the secondary cell is associated with the known status based at least in part on the UE having reported a measurement for an SSB for the secondary cell within a time window, the SSB for which the measurement was reported remaining detectable within the time window, and an SSB serving as a quasi-colocation source for the measurement being detectable in the time period.

In a second aspect, alone or in combination with the first aspect, the set of factors includes a frequency range associated with the secondary cell.

In a third aspect, alone or in combination with one or more of the first and second aspects, the set of factors includes a hybrid automatic repeat request timing between receiving a downlink data transmission and acknowledging the downlink data transmission.

In a fourth aspect, alone or in combination with one or more of the first through third aspects, the set of factors includes whether the secondary cell is associated with Frequency Range 1 or Frequency Range 2.

In a fifth aspect, alone or in combination with one or more of the first through fourth aspects, the set of factors includes a time at which a first synchronization signal block is received after the physical-layer control information is received by the UE.

In a sixth aspect, alone or in combination with one or more of the first through fifth aspects, the set of factors includes respective synchronization signal/physical broadcast channel block measurement timing configurations of a serving cell of the UE and the secondary cell.

In a seventh aspect, alone or in combination with one or more of the first through sixth aspects, the set of factors includes a synchronization signal/physical broadcast channel block measurement timing configuration periodicity of the secondary cell.

In an eighth aspect, alone or in combination with one or more of the first through seventh aspects, the set of factors includes a measurement delay associated with a physical-layer measurement on the secondary cell.

In a ninth aspect, alone or in combination with one or more of the first through eighth aspects, the set of factors includes a slot length of the secondary cell.

In a tenth aspect, alone or in combination with one or more of the first through ninth aspects, activating or deactivating the secondary cell within the time period in accordance with the physical-layer control information further comprises at least one of transmitting a valid channel state information report within the time period, or performing one or more actions related to the physical-layer control information within the time period.

In some aspects, a base station for wireless communication may include a memory and one or more processors operatively coupled to the memory. The memory and the one or more processors may be configured to transmit, to a UE, physical-layer control information indicating to activate or deactivate a secondary cell; and receive a communication associated with activating or deactivating the secondary cell within a time period in accordance with the physical-layer control information, wherein the time period is based at least in part on a set of factors and based at least in part on the secondary cell being activated or deactivated by the physical-layer control information.

In a first aspect, the status is a known status, and the secondary cell is associated with the known status based at least in part on the UE having reported a measurement for an SSB for the secondary cell within a time window, the SSB for which the measurement was reported remaining detectable within the time window, and an SSB serving as a quasi-colocation source for the measurement being detectable in the time period.

In a second aspect, alone or in combination with the first aspect, the set of factors includes a frequency range associated with the secondary cell.

In a third aspect, alone or in combination with one or more of the first and second aspects, the set of factors includes a hybrid automatic repeat request timing between receiving a downlink data transmission and acknowledging the downlink data transmission.

In a fourth aspect, alone or in combination with one or more of the first through third aspects, the set of factors includes whether the secondary cell is associated with Frequency Range 1 or Frequency Range 2.

In a fifth aspect, alone or in combination with one or more of the first through fourth aspects, the set of factors includes a time at which a first synchronization signal block is received after the physical-layer control information is received by the UE.

In a sixth aspect, alone or in combination with one or more of the first through fifth aspects, the set of factors includes respective synchronization signal/physical broadcast channel block measurement timing configurations of a serving cell of the UE and the secondary cell.

In a seventh aspect, alone or in combination with one or more of the first through sixth aspects, the set of factors includes a synchronization signal/physical broadcast channel block measurement timing configuration periodicity of the secondary cell.

In an eighth aspect, alone or in combination with one or more of the first through seventh aspects, the set of factors includes a measurement delay associated with a physical-layer measurement on the secondary cell.

In a ninth aspect, alone or in combination with one or more of the first through eighth aspects, the set of factors includes a slot length of the secondary cell.

In a tenth aspect, alone or in combination with one or more of the first through ninth aspects, the communication associated with activating or deactivating the secondary cell within the time period in accordance with the physical-layer control information includes a valid channel state information report received within the time period.

In some aspects, a non-transitory computer-readable medium may store one or more instructions for wireless communication. The one or more instructions, when executed by one or more processors of a UE, may cause the one or more processors to receive physical-layer control information indicating to activate or deactivate a secondary cell; and activate or deactivating the secondary cell within a time period in accordance with the physical-layer control information, wherein the time period is based at least in part on a set of factors and based at least in part on the secondary cell being activated or deactivated by the physical-layer control information.

In a first aspect, the status is a known status, and the secondary cell is associated with the known status based at least in part on the UE having reported a measurement for an SSB for the secondary cell within a time window, the SSB for which the measurement was reported remaining detectable within the time window, and an SSB serving as a quasi-colocation source for the measurement being detectable in the time period.

In a second aspect, alone or in combination with the first aspect, the set of factors includes a frequency range associated with the secondary cell.

In a third aspect, alone or in combination with one or more of the first and second aspects, the set of factors includes a hybrid automatic repeat request timing between receiving a downlink data transmission and acknowledging the downlink data transmission.

In a fourth aspect, alone or in combination with one or more of the first through third aspects, the set of factors includes whether the secondary cell is associated with Frequency Range 1 or Frequency Range 2.

In a fifth aspect, alone or in combination with one or more of the first through fourth aspects, the set of factors includes a time at which a first synchronization signal block is received after the physical-layer control information is received by the UE.

In a sixth aspect, alone or in combination with one or more of the first through fifth aspects, the set of factors includes respective synchronization signal/physical broadcast channel block measurement timing configurations of a serving cell of the UE and the secondary cell.

In a seventh aspect, alone or in combination with one or more of the first through sixth aspects, the set of factors includes a synchronization signal/physical broadcast channel block measurement timing configuration periodicity of the secondary cell.

In an eighth aspect, alone or in combination with one or more of the first through seventh aspects, the set of factors includes a measurement delay associated with a physical-layer measurement on the secondary cell.

In a ninth aspect, alone or in combination with one or more of the first through eighth aspects, the set of factors includes a slot length of the secondary cell.

In a tenth aspect, alone or in combination with one or more of the first through ninth aspects, activating or deactivating the secondary cell within the time period in accordance with the physical-layer control information further comprises at least one of transmitting a valid channel state information report within the time period, or performing one or more actions related to the physical-layer control information within the time period.

In some aspects, a non-transitory computer-readable medium may store one or more instructions for wireless communication. The one or more instructions, when executed by one or more processors of a base station, may cause the one or more processors to transmit, to a UE, physical-layer control information indicating to activate or deactivate a secondary cell; and receive a communication associated with activating or deactivating the secondary cell within a time period in accordance with the physical-layer control information, wherein the time period is based at least in part on a set of factors and based at least in part on the secondary cell being activated or deactivated by the physical-layer control information.

In a first aspect, the status is a known status, and the secondary cell is associated with the known status based at least in part on the UE having reported a measurement for an SSB for the secondary cell within a time window, the SSB for which the measurement was reported remaining detectable within the time window, and an SSB serving as a quasi-colocation source for the measurement being detectable in the time period.

In a second aspect, alone or in combination with the first aspect, the set of factors includes a frequency range associated with the secondary cell.

In a third aspect, alone or in combination with one or more of the first and second aspects, the set of factors includes a hybrid automatic repeat request timing between receiving a downlink data transmission and acknowledging the downlink data transmission.

In a fourth aspect, alone or in combination with one or more of the first through third aspects, the set of factors includes whether the secondary cell is associated with Frequency Range 1 or Frequency Range 2.

In a fifth aspect, alone or in combination with one or more of the first through fourth aspects, the set of factors includes a time at which a first synchronization signal block is received after the physical-layer control information is received by the UE.

In a sixth aspect, alone or in combination with one or more of the first through fifth aspects, the set of factors includes respective synchronization signal/physical broadcast channel block measurement timing configurations of a serving cell of the UE and the secondary cell.

In a seventh aspect, alone or in combination with one or more of the first through sixth aspects, the set of factors includes a synchronization signal/physical broadcast channel block measurement timing configuration periodicity of the secondary cell.

In an eighth aspect, alone or in combination with one or more of the first through seventh aspects, the set of factors includes a measurement delay associated with a physical-layer measurement on the secondary cell.

In a ninth aspect, alone or in combination with one or more of the first through eighth aspects, the set of factors includes a slot length of the secondary cell.

In a tenth aspect, alone or in combination with one or more of the first through ninth aspects, the communication associated with activating or deactivating the secondary cell within the time period in accordance with the physical-layer control information includes a valid channel state information report received within the time period.

In some aspects, an apparatus for wireless communication may include means for receiving physical-layer control information indicating to activate or deactivate a secondary cell; and means for activating or deactivating the secondary cell within a time period in accordance with the physical-layer control information, wherein the time period is based at least in part on a set of factors and based at least in part on the secondary cell being activated or deactivated by the physical-layer control information.

In a first aspect, the status is a known status, and the secondary cell is associated with the known status based at least in part on the apparatus having reported a measurement for an SSB for the secondary cell within a time window, the SSB for which the measurement was reported remaining detectable within the time window, and an SSB serving as a quasi-colocation source for the measurement being detectable in the time period.

In a second aspect, alone or in combination with the first aspect, the set of factors includes a frequency range associated with the secondary cell.

In a third aspect, alone or in combination with one or more of the first and second aspects, the set of factors includes a hybrid automatic repeat request timing between receiving a downlink data transmission and acknowledging the downlink data transmission.

In a fourth aspect, alone or in combination with one or more of the first through third aspects, the set of factors includes whether the secondary cell is associated with Frequency Range 1 or Frequency Range 2.

In a fifth aspect, alone or in combination with one or more of the first through fourth aspects, the set of factors includes a time at which a first synchronization signal block is received after the physical-layer control information is received by the apparatus.

In a sixth aspect, alone or in combination with one or more of the first through fifth aspects, the set of factors includes respective synchronization signal/physical broadcast channel block measurement timing configurations of a serving cell of the apparatus and the secondary cell.

In a seventh aspect, alone or in combination with one or more of the first through sixth aspects, the set of factors includes a synchronization signal/physical broadcast channel block measurement timing configuration periodicity of the secondary cell.

In an eighth aspect, alone or in combination with one or more of the first through seventh aspects, the set of factors includes a measurement delay associated with a physical-layer measurement on the secondary cell.

In a ninth aspect, alone or in combination with one or more of the first through eighth aspects, the set of factors includes a slot length of the secondary cell.

In a tenth aspect, alone or in combination with one or more of the first through ninth aspects, activating or deactivating the secondary cell within the time period in accordance with the physical-layer control information further comprises at least one of transmitting a valid channel state information report within the time period, or performing one or more actions related to the physical-layer control information within the time period.

In some aspects, an apparatus for wireless communication may include means for transmitting, to a UE, physical-layer control information indicating to activate or deactivate a secondary cell; and means for receiving a communication associated with activating or deactivating the secondary cell within a time period in accordance with the physical-layer control information, wherein the time period is based at least in part on a set of factors and based at least in part on the secondary cell being activated or deactivated by the physical-layer control information.

In a first aspect, the status is a known status, and the secondary cell is associated with the known status based at least in part on the UE having reported a measurement for an SSB for the secondary cell within a time window, the SSB for which the measurement was reported remaining detectable within the time window, and an SSB serving as a quasi-colocation source for the measurement being detectable in the time period.

In a second aspect, alone or in combination with the first aspect, the set of factors includes a frequency range associated with the secondary cell.

In a third aspect, alone or in combination with one or more of the first and second aspects, the set of factors includes a hybrid automatic repeat request timing between receiving a downlink data transmission and acknowledging the downlink data transmission.

In a fourth aspect, alone or in combination with one or more of the first through third aspects, the set of factors includes whether the secondary cell is associated with Frequency Range 1 or Frequency Range 2.

In a fifth aspect, alone or in combination with one or more of the first through fourth aspects, the set of factors includes a time at which a first synchronization signal block is received after the physical-layer control information is received by the UE.

In a sixth aspect, alone or in combination with one or more of the first through fifth aspects, the set of factors includes respective synchronization signal/physical broadcast channel block measurement timing configurations of a serving cell of the UE and the secondary cell.

In a seventh aspect, alone or in combination with one or more of the first through sixth aspects, the set of factors includes a synchronization signal/physical broadcast channel block measurement timing configuration periodicity of the secondary cell.

In an eighth aspect, alone or in combination with one or more of the first through seventh aspects, the set of factors includes a measurement delay associated with a physical-layer measurement on the secondary cell.

In a ninth aspect, alone or in combination with one or more of the first through eighth aspects, the set of factors includes a slot length of the secondary cell.

In a tenth aspect, alone or in combination with one or more of the first through ninth aspects, the communication associated with activating or deactivating the secondary cell within the time period in accordance with the physical-layer control information includes a valid channel state information report received within the time period.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a conceptual data flow diagram illustrating data flow between different components in an example apparatus, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
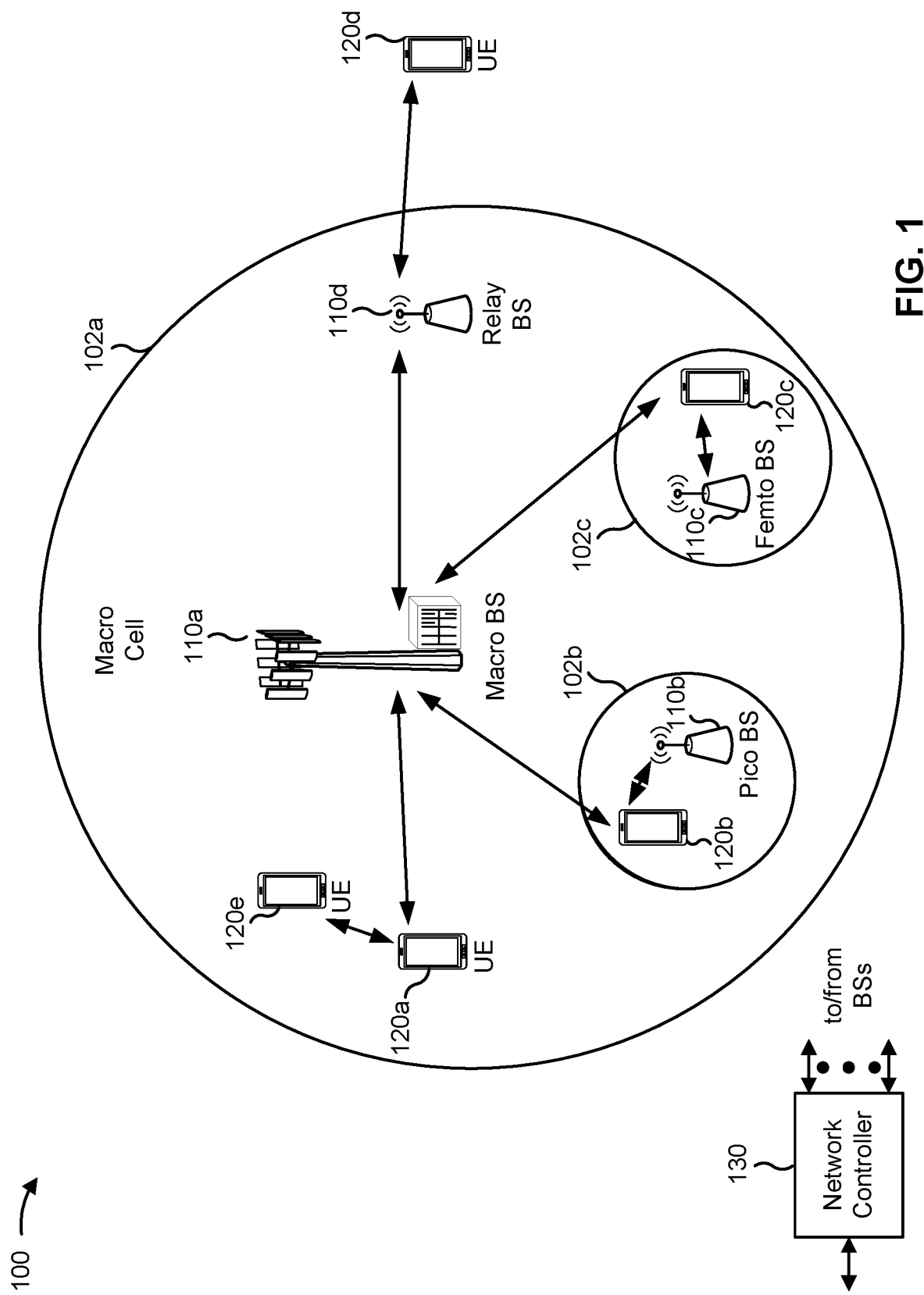
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
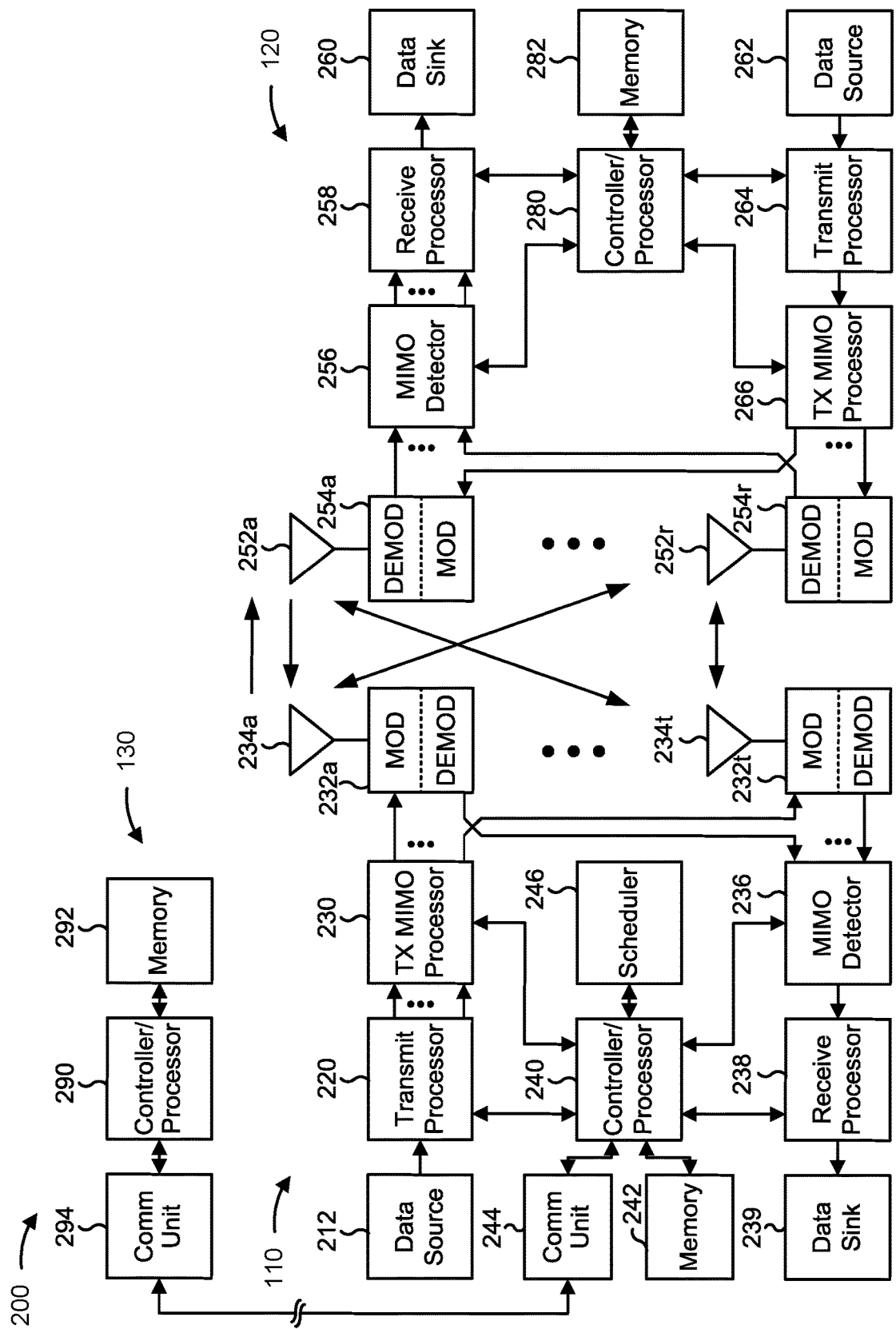
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a delay for DCI-based SCell activation/deactivation, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for receiving physical-layer control information indicating to activate or deactivate a secondary cell; means for activating or deactivating the secondary cell within a time period in accordance with the physical-layer control information; means for transmitting a valid channel state information report within the time period; means for performing one or more actions related to the physical-layer control information within the time period; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a user equipment (UE), physical-layer control information indicating to activate or deactivate a secondary cell, means for receiving a communication associated with activating or deactivating the secondary cell within a time period in accordance with the physical-layer control information, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may use dual connectivity to connect to multiple cells at once. For example, the UE may select a set of candidate cells, and may select one or more primary cells (PCells), secondary cells (SCells), primary secondary cells (PSCells), and/or secondary primary cells or special cells (SPCells). The PCell and SCell may be referred to as serving cells. In some aspects, "SPCell" may refer to a PCell of a master cell group or a PSCell of a secondary cell group, or to the PCell. "Cells" may sometimes be referred to as "carriers." A PCell is a cell, operating on a primary frequency, in which the UE either performs an initial connection establishment procedure or initiates a connection re-establishment procedure, or the cell indicated as the primary cell in a handover procedure. An SCell is a cell, operating on a secondary frequency, which may be configured once a connection (e.g., a radio resource control connection) is established and which may be used to provide additional radio resources.

It may be beneficial to reduce latency and higher-layer overhead of operations associated with dual connectivity, such as Layer 1 or Layer 2 centric inter-cell mobility. One example of such an operation is activation or deactivation of an SCell, which may be performed using medium access control (MAC)-layer (i.e., Layer 2) signaling. For example, an SCell may be configured for a UE, and may be in an inactive state after configuration. A UE cannot transmit or receive data (e.g., a shared channel or a control channel) on an inactive SCell. After the SCell is configured, the SCell can be activated, which makes the SCell available for data communication. In some cases, activation or deactivation (activation/deactivation) of a set of SCells (e.g., an SCell, multiple SCells, a group of SCells, multiple groups of SCells, and/or the like) may be performed using a physical-layer (i.e., Layer 1) control signal, such as downlink control information (DCI). However, if a UE is permitted to activate or deactivate a set of SCells within an undefined time frame, some UEs may cause delay or latency in the network by using an undesirably long time to activate or deactivate the set of SCells. Furthermore, a time limit for activating or deactivating an SCell that is based at least in part on MAC-layer signaling may not be suitable for physical-layer activation or deactivation of the SCell due to the different latencies and overhead characteristics of the physical layer relative to the MAC layer.

Some techniques and apparatuses described herein define and implement a time period defining a maximum delay for a DCI-based (e.g., physical layer) activation or deactivation of a set of SCells. For example, the time period may be based at least in part on whether an SCell is associated with a known status, described elsewhere herein. The time period may be based at least in part on the SCell being activated or deactivated by physical-layer control information (e.g., DCI). By defining the time period for the maximum delay for DCI-based activation or deactivation of the set of SCells, latency and uncertainty in network configuration are reduced. Furthermore, the usage of DCI-based activation or deactivation of a set of SCells is improved, which further reduces latency in network configuration. This reduction of latency may be particularly beneficial for inter-cell mobility associated with non-standalone (NSA) deployments, standalone (SA) deployments, intra-band carrier aggregation deployments, intra-radio access technology deployments, and intra-frequency handover scenarios, such as L1/L2-centric inter-cell mobility, though these enhancements are also beneficial for, and can be used for, other uses cases, such as inter-frequency handover, inter-band carrier aggregation, and inter-distributed-unit operation.

Figure 3:
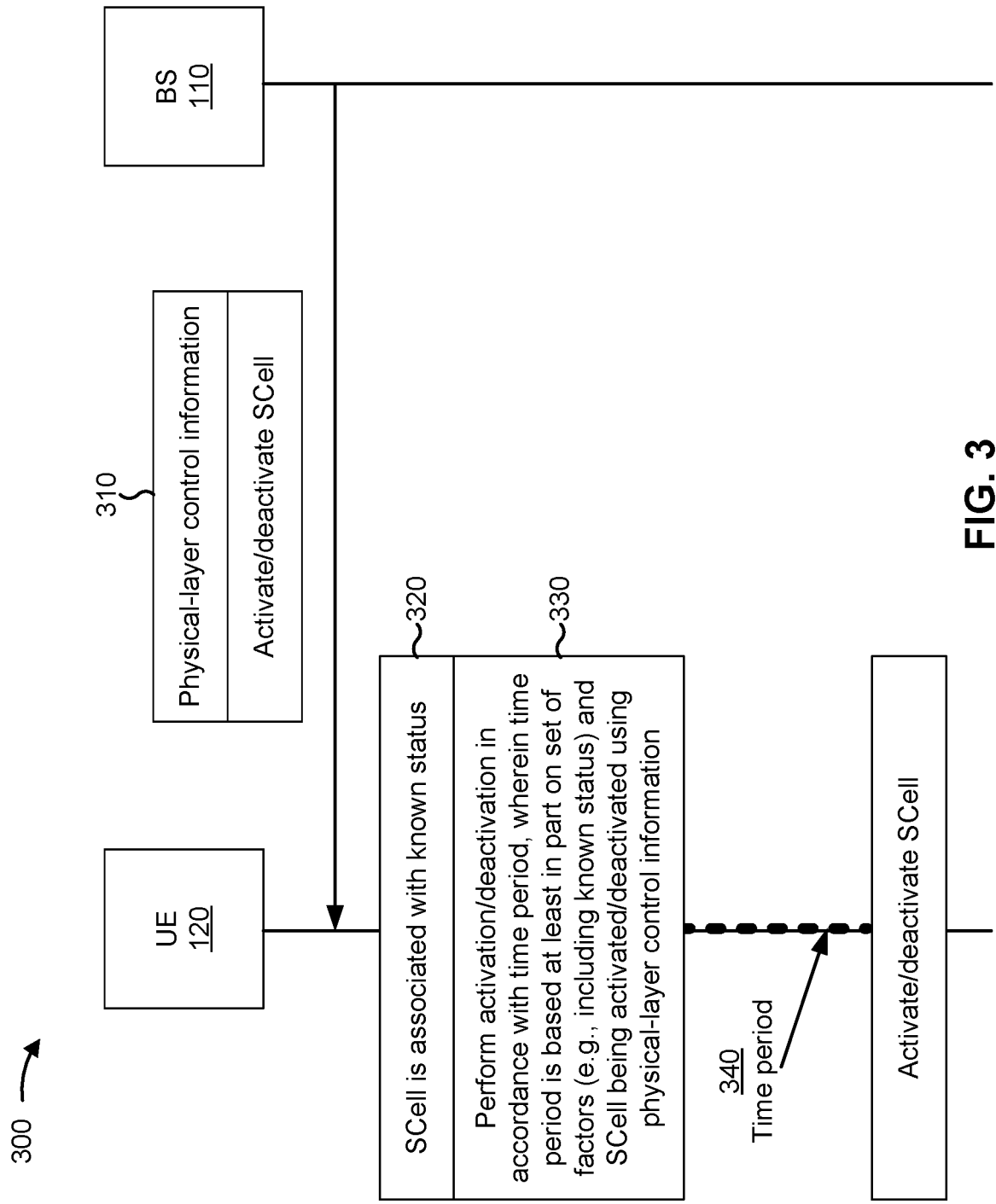
FIG. 3 is a diagram illustrating an example of a delay for DCI-based SCell activation/deactivation, in accordance with various aspects of the present disclosure.

FIG. 3 is a diagram illustrating an example 300 of a delay for DCI-based SCell activation/deactivation, in accordance with various aspects of the present disclosure. As shown, example 300 includes a UE 120 and a BS 110. The BS 110 may provide a serving cell of the UE 120. In some aspects, the BS 110 may provide an SCell of the UE 120, though the operations described in example 300 need not be performed by a BS 110 that provides the same SCell that is to be activated or deactivated.

As shown by reference number 310, the BS 110 may provide physical-layer control information indicating to activate or deactivate an SCell. For example, the physical-layer control information may include DCI that indicates the SCell (e.g., based at least in part on a cell identifier or physical cell identifier (PCI) of the SCell) and indicates that the SCell is to be activated or deactivated.

As shown by reference number 320, the UE 120 may determine whether the SCell that is to be activated or deactivated is associated with a known status. The UE 120 may determine whether the SCell is associated with the known status in order to determine a length of a time period that defines a maximum delay for activating or deactivating the SCell. In some aspects, whether the SCell is associated with the known status may be based at least in part on a frequency range associated with the SCell. For example, criteria for whether the SCell is associated with the known status may be different for an SCell associated with Frequency Range 1 (FR1) than for an SCell associated with Frequency Range 2 (FR2). Generally, an SCell may be associated with a known status if the UE 120 has reported a synchronization signal block (SSB) measurement for the SCell in the previous X seconds (where X is a number), the reported SSB(s) have remained detectable during the previous X seconds, and one or more SSBs serving as downlink or uplink quasi-colocation (QCL) sources for the SCell have remained detectable in the previous X seconds. Definitions of the known status for FR1 and FR2 are provided below.

For FR1, an SCell is associated with a known status if:
  during a period equal to the maximum of an SCell measurement cycle or a discontinuous reception (DRX) cycle for FR1 before the reception of the SCell activation command:
    a. the UE 120 has transmitted a valid measurement report for the SCell being activated, and
    b. the SSB measured remains detectable according to one or more cell identification conditions specified in clause 9.2 and 9.3 of 3GPP Technical Specification 38.133 Section 8, and
  the SSB measured during the period also remains detectable during the SCell activation delay according to the cell identification conditions specified in clause 9.2 and 9.3 of 3GPP Technical Specification 38.133 Section 8.

Otherwise, the SCell in FR1 is unknown or is not associated with the known status.

For FR2, an SCell is associated with a known status if:
during a period equal to 4 seconds for a UE supporting Power Class 1 and 3 seconds for a UE supporting Power Class 2, 3, or 4, before the UE receives the last activation command for a physical downlink control channel (PDCCH) transmission configuration indicator (TCI), a physical downlink shared channel (PDSCH) TCI (when applicable), and a semi-persistent channel state information reference signal (CSI-RS) for channel quality indicator (CQI) reporting (when applicable):
a. the UE has transmitted a valid Layer 3 (L3) reference signal received power (RSRP) measurement report with an SSB index, and
b. the SCell activation command is received after L3-RSRP reporting and no later than a time when the UE receives a MAC control element command for TCI activation, and
during the period from L3-RSRP reporting to valid CQI reporting, the reported SSBs with indexes remain detectable according to the cell identification conditions specified in clauses 9.2 and 9.3 of 3GPP Technical Specification 38.133 Section 8, and the TCI state is selected based on one of the latest reported SSB indexes.
Otherwise, the first SCell in FR2 band is unknown or is not associated with a known status.

In some aspects, the UE 120 may determine a length of the time period based at least in part on whether the SCell is associated with a known status. For example, the UE 120 may determine a shorter length of the time period based at least in part on the SCell being associated with a known status, or may determine a longer length of the time period based at least in part on the SCell not being associated with a known status.

In some aspects, the UE 120 may determine a length of the time period based at least in part on a timing between a downlink data transmission and a corresponding acknowledgment. For example, the UE 120 may determine the length of the time period based at least in part on a hybrid automatic repeat request (HARM) timing between receiving a downlink data transmission and acknowledging the downlink data transmission (e.g., a T_HARQ value and/or the like).

In some aspects, the UE 120 may determine a length of the time period based at least in part on a frequency range associated with the secondary cell. For example, the UE 120 may determine a longer time period for an FR1 SCell and may determine a shorter time period for an FR2 SCell, or vice versa.

In some aspects, the UE 120 may determine a length of the time period based at least in part on a time at which a first synchronization signal block is received after the physical-layer control information (e.g., the DCI) is received by the UE 120. For example, the UE 120 may determine the length of the time period based at least in part on a time defined by a variable T_first-SSB.

In some aspects, the UE 120 may determine a length of the time period based at least in part on respective synchronization signal block based radio resource management measurement timing configurations (SMTCs) of the serving cell of the UE 120 and the SCell. For example, the UE 120 may determine the length of the time period based at least in part on a longer SMTC periodicity (e.g., T_SMTC_MAX) of the active serving cell(s) of the UE 120 and the SCell being activated or deactivated. An SMTC periodicity (sometimes referred to as an SMTC window periodicity) may define a periodicity at which a window for measurement of SSBs of a cell occurs.

In some aspects, the UE 120 may determine a length of the time period based at least in part on an SMTC periodicity of the SCell (e.g., T_rs). For example, the UE 120 may determine a longer time period for a longer SMTC periodicity, and may determine a shorter time period for a shorter SMTC periodicity.

In some aspects, the UE 120 may determine a length of the time period based at least in part on a measurement delay associated with a physical-layer measurement on the SCell. For example, the UE 120 may determine the length of the time period based at least in part on an L1-RSRP measurement delay (e.g., T_L1-RSRP). In this case, the UE 120 may determine a longer length of the time period based at least in part on a longer L1-RSRP measurement delay, or may determine a shorter length of the time period based at least in part on a shorter L1-RSRP measurement delay.

In some aspects, the UE 120 may determine a length of the time period based at least in part on a slot length of the SCell. For example, the UE 120 may determine a longer length of the time period for an SCell associated with a longer slot length, and may determine a shorter length of the time period for an SCell associated with a shorter slot length.

In some aspects, the UE 120 may determine the length of the time period based at least in part on a combination of the above factors and/or based at least in part on a combination of one or more of the above factors and a factor not listed above.

As shown by reference number 330, the UE 120 may perform the activation or deactivation in accordance with a time period. The time period is shown by the dashed line indicated by reference number 340. For example, the UE 120 may determine a length of the time period as described above. If the UE 120 receives the SCell activation/deactivation physical-layer control information in slot n, the UE 120 may apply the activation/deactivation physical-layer control information no later than in slot n+M, where M is the length of the time period expressed in slots. In some aspects, applying the physical-layer control information may refer to activating or deactivating the SCell indicated by the physical-layer control information. In some aspects, applying the physical-layer control information may refer to transmitting a valid channel state information (CSI) report associated with the SCell. In some aspects, applying the physical-layer control information may refer to one or more actions indicated by the activation DCI for the SCell. In some aspects, applying the physical-layer control information may refer to a combination of the above actions. In some aspects, the BS 110 may receive a communication associated with activating or deactivating the SCell within the time period (e.g., taking into account propagation delay), such as the CSI report generated by the UE 120.

In this way, the UE 120 may determine and apply a time period associated with a maximum delay for a DCI-based activation or deactivation of an SCell. The usage of the time period may reduce latency and uncertainty associated with SCell activation or deactivation, and may improve the performance and reduce the latency of DCI-based activation or deactivation, which may be more latency-sensitive than higher-layer SCell activation or deactivation techniques.

As indicated above, FIG. 3 is provided as an example. Other examples may differ from what is described with respect to FIG. 3.

Figure 4:
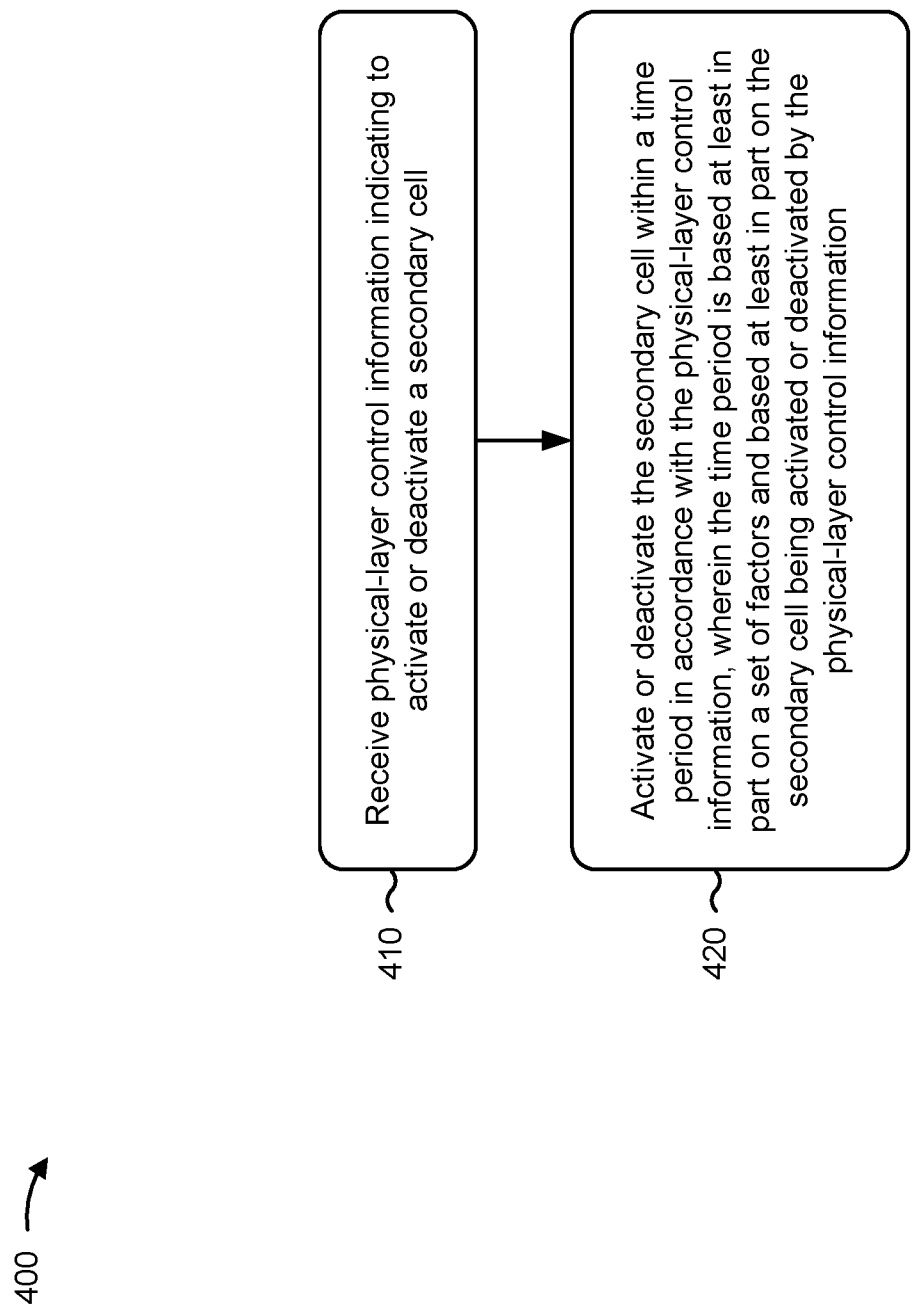
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with a delay for DCI-based activation or deactivation of an SCell.

As shown in FIG. 4, in some aspects, process 400 may include receiving physical-layer control information indicating to activate or deactivate a secondary cell (block 410). For example, the UE (e.g., using antenna 252, DEMOD 254, MIMO detector 256, receive processor 258, controller/processor 280, and/or the like) may receive physical-layer control information indicating to activate or deactivate a secondary cell, as described above.

As further shown in FIG. 4, in some aspects, process 400 may include activating or deactivating the secondary cell within a time period in accordance with the physical-layer control information, wherein the time period is based at least in part on a set of factors and based at least in part on the secondary cell being activated or deactivated by the physical-layer control information (block 420). For example, the UE (e.g., using antenna 252, DEMOD 254, MIMO detector 256, receive processor 258, controller/processor 280, and/or the like) may activate or deactivate the secondary cell within a time period in accordance with the physical-layer control information, as described above. The time period may be based at least in part on whether the secondary cell is associated with a known status, and may be based at least in part on the secondary cell being activated or deactivated by the physical-layer control information Process 400 may include additional aspects, such as any single aspect or any combination of aspects described below and/or in connection with one or more other processes described elsewhere herein.

In a first aspect, the status is a known status, and the secondary cell is associated with the known status based at least in part on the UE having reported a measurement for an SSB for the secondary cell within a time window, the SSB for which the measurement was reported remaining detectable within the time window, and an SSB serving as a quasi-colocation source for the measurement being detectable in the time period.

In a second aspect, alone or in combination with the first aspect, the set of factors includes a frequency range associated with the secondary cell.

In a third aspect, alone or in combination with one or more of the first and second aspects, the set of factors includes a hybrid automatic repeat request timing between receiving a downlink data transmission and acknowledging the downlink data transmission.

In a fourth aspect, alone or in combination with one or more of the first through third aspects, the set of factors includes whether the secondary cell is associated with Frequency Range 1 or Frequency Range 2.

In a fifth aspect, alone or in combination with one or more of the first through fourth aspects, the set of factors includes a time at which a first synchronization signal block is received after the physical-layer control information is received by the UE.

In a sixth aspect, alone or in combination with one or more of the first through fifth aspects, the set of factors includes respective synchronization signal/physical broadcast channel block measurement timing configurations of a serving cell of the UE and the secondary cell.

In a seventh aspect, alone or in combination with one or more of the first through sixth aspects, the set of factors includes a synchronization signal/physical broadcast channel block measurement timing configuration periodicity of the secondary cell.

In an eighth aspect, alone or in combination with one or more of the first through seventh aspects, the set of factors includes a measurement delay associated with a physical-layer measurement on the secondary cell.

In a ninth aspect, alone or in combination with one or more of the first through eighth aspects, the set of factors includes a slot length of the secondary cell.

In a tenth aspect, alone or in combination with one or more of the first through ninth aspects, activating or deactivating the secondary cell within the time period in accordance with the physical-layer control information further comprises at least one of transmitting a valid channel state information report within the time period, or performing one or more actions related to the physical-layer control information within the time period.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
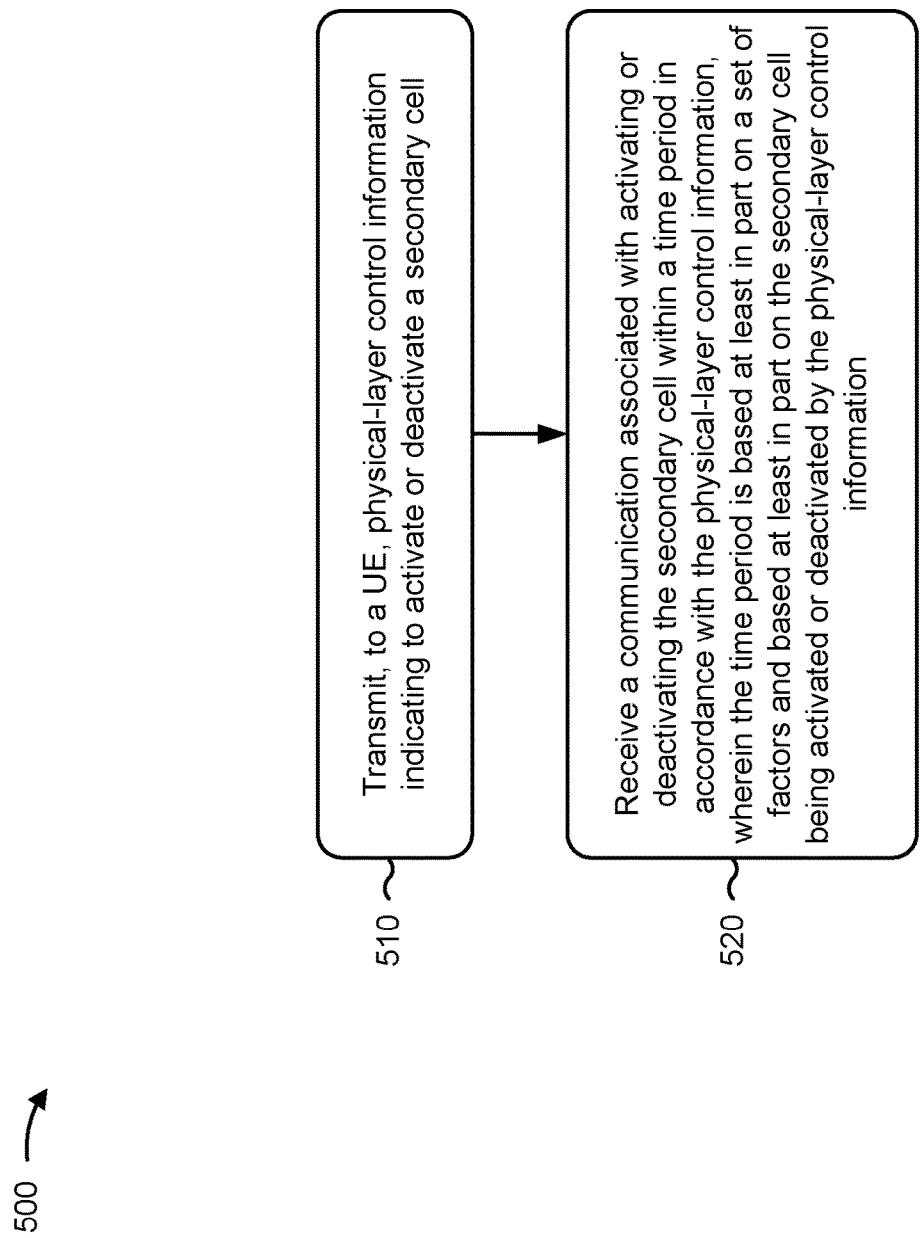
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where the base station (e.g., base station 110 and/or the like) performs operations associated with a delay for DCI-based activation or deactivation of an SCell.

As shown in FIG. 5, in some aspects, process 500 may include transmitting, to a UE, physical-layer control information indicating to activate or deactivate a secondary cell (block 510). For example, the base station (e.g., using controller/processor 240, transmit processor 220, TX MIMO processor 230, MOD 232, antenna 234, and/or the like) may transmit, to a UE, physical-layer control information indicating to activate or deactivate a secondary cell, as described above.

As further shown in FIG. 5, in some aspects, process 500 may include receiving a communication associated with activating or deactivating the secondary cell within a time period in accordance with the physical-layer control information, wherein the time period is based at least in part on a set of factors and based at least in part on the secondary cell being activated or deactivated by the physical-layer control information (block 520). For example, the base station (e.g., using antenna 234, DEMOD 232, MIMO detector 236, receive processor 238, controller/processor 240, and/or the like) may receive a communication associated with activating or deactivating the secondary cell within a time period in accordance with the physical-layer control information, as described above.

Process 500 may include additional aspects, such as any single aspect or any combination of aspects described below and/or in connection with one or more other processes described elsewhere herein.

In a first aspect, the status is a known status, and the secondary cell is associated with the known status based at least in part on the UE having reported a measurement for an SSB for the secondary cell within a time window, the SSB for which the measurement was reported remaining detectable within the time window, and an SSB serving as a quasi-colocation source for the measurement being detectable in the time period.

In a second aspect, alone or in combination with the first aspect, the set of factors includes a frequency range associated with the secondary cell.

In a third aspect, alone or in combination with one or more of the first and second aspects, the set of factors includes a hybrid automatic repeat request timing between receiving a downlink data transmission and acknowledging the downlink data transmission.

In a fourth aspect, alone or in combination with one or more of the first through third aspects, the set of factors includes whether the secondary cell is associated with Frequency Range 1 or Frequency Range 2.

In a fifth aspect, alone or in combination with one or more of the first through fourth aspects, the set of factors includes a time at which a first synchronization signal block is received after the physical-layer control information is received by the UE.

In a sixth aspect, alone or in combination with one or more of the first through fifth aspects, the set of factors includes respective synchronization signal/physical broadcast channel block measurement timing configurations of a serving cell of the UE and the secondary cell.

In a seventh aspect, alone or in combination with one or more of the first through sixth aspects, the set of factors includes a synchronization signal/physical broadcast channel block measurement timing configuration periodicity of the secondary cell.

In an eighth aspect, alone or in combination with one or more of the first through seventh aspects, the set of factors includes a measurement delay associated with a physical-layer measurement on the secondary cell.

In a ninth aspect, alone or in combination with one or more of the first through eighth aspects, the set of factors includes a slot length of the secondary cell.

In a tenth aspect, alone or in combination with one or more of the first through ninth aspects, the communication associated with activating or deactivating the secondary cell within the time period in accordance with the physical-layer control information includes a valid channel state information report received within the time period.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
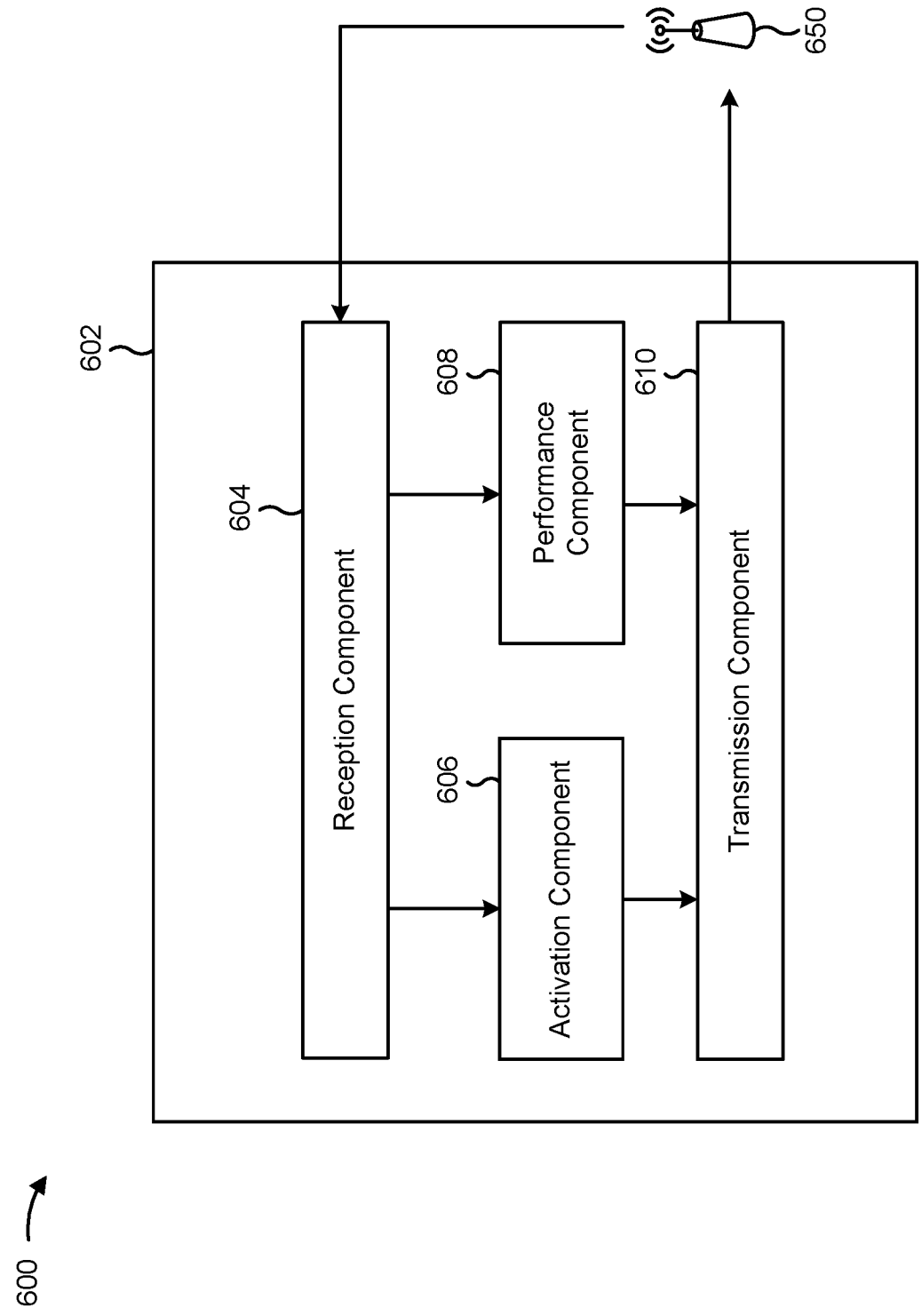
FIG. 6 is a conceptual data flow diagram illustrating data flow between different components in an example apparatus, in accordance with various aspects of the present disclosure.

FIG. 6 is a conceptual data flow diagram 600 illustrating data flow between different components in an example apparatus 602. The apparatus 602 may be a UE (e.g., UE 120). In some aspects, the apparatus 602 includes a reception component 604, an activation component 606, a performance component 608, and/or a transmission component 610.

The reception component 604 may be implemented using antenna 252, DEMOD 254, MIMO detector 256, receive processor 258, controller/processor 280, and/or the like. The reception component 604 may receive, from a base station 650, physical-layer control information indicating to activate or deactivate a secondary cell.

The activation component 606 may be implemented using antenna 252, DEMOD 254, MIMO detector 256, receive processor 258, controller/processor 280, and/or the like. The activation component 606 may activate or deactivate the secondary cell within a time period in accordance with the physical-layer control information.

The performance component 608 may be implemented using controller/processor 280, transmit processor 264, TX MIMO processor 266, MOD 254, antenna 252, and/or the like. The performance component 608 may perform one or more actions related to the physical-layer control information within the time period.

The transmission component 610 may be implemented using controller/processor 280, transmit processor 264, TX MIMO processor 266, MOD 254, antenna 252, and/or the like. The transmission component 610 may transmit a valid channel state information report within the time period.

The apparatus may include additional components that perform each of the blocks of the algorithm in the aforementioned process 400 of FIG. 4 and/or the like. Each block in the aforementioned process 400 of FIG. 4 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

FIG. 7 is a conceptual data flow diagram 700 illustrating data flow between different components in an example apparatus 702. The apparatus 702 may be a base station (e.g., base station 110). In some aspects, the apparatus 702 includes a reception component 704, a determination component 706, and/or a transmission component 708.

The reception component 704 may be implemented using antenna 234, DEMOD 232, MIMO detector 236, receive processor 238, controller/processor 240, and/or the like. The reception component 704 may receive, from a UE 750, a communication associated with activating or deactivating the secondary cell within a time period in accordance with the physical-layer control information.

The determination component 706 may be implemented using controller/processor 240 and/or the like. The determination component 706 may determine the time period based at least in part on whether the secondary cell is associated with a known status and/or based at least in part on the secondary cell being activated or deactivated by physical-layer control information.

The transmission component 708 may be implemented using controller/processor 240, transmit processor 220, TX MIMO processor 230, MOD 232, antenna 234, and/or the like. The transmission component 708 may transmit, to a UE, physical-layer control information indicating to activate or deactivate a secondary cell.

The apparatus may include additional components that perform each of the blocks of the algorithm in the aforementioned process 500 of FIG. 5 and/or the like. Each block in the aforementioned process 500 of FIG. 5 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

The following provides an overview of aspects of the present disclosure:

Aspect 1: A method of wireless communication performed by a user equipment (UE), comprising: receiving physical-layer control information indicating to activate or deactivate a secondary cell; and activating or deactivating the secondary cell within a time period in accordance with the physical-layer control information, wherein the time period is based at least in part on a set of factors and based at least in part on the secondary cell being activated or deactivated by the physical-layer control information.

Aspect 2: The method of aspect 1, wherein the status is a known status, and wherein the secondary cell is associated with the known status based at least in part on the UE having reported a measurement for a synchronization signal block (SSB) for the secondary cell within a time window, the SSB for which the measurement was reported remaining detectable within the time window, and an SSB serving as a quasi-colocation source for the measurement being detectable in the time period.

Aspect 3: The method of any of aspects 1-2, wherein the set of factors includes a frequency range associated with the secondary cell.

Aspect 4: The method of any of aspects 1-3, wherein the set of factors includes a hybrid automatic repeat request timing between receiving a downlink data transmission and acknowledging the downlink data transmission.

Aspect 5: The method of any of aspects 1-4, wherein the set of factors includes a frequency range associated with the secondary cell.

Aspect 6: The method of any of aspects 1-5, wherein the set of factors includes a time at which a first synchronization signal block is received after the physical-layer control information is received by the UE.

Aspect 7: The method of any of aspects 1-6, wherein the set of factors includes respective synchronization signal/physical broadcast channel block measurement timing configurations of a serving cell of the UE and the secondary cell.

Aspect 8: The method of any of aspects 1-7, wherein the set of factors includes a synchronization signal/physical broadcast channel block measurement timing configuration periodicity of the secondary cell.

Aspect 9: The method of any of aspects 1-8, wherein the set of factors includes a measurement delay associated with a physical-layer measurement on the secondary cell.

Aspect 10: The method of any of aspects 1-9, wherein the set of factors includes a slot length of the secondary cell.

Aspect 11: The method of any of aspects 1-10, wherein activating or deactivating the secondary cell within the time period in accordance with the physical-layer control information further comprises at least one of: transmitting a valid channel state information report within the time period, or performing one or more actions related to the physical-layer control information within the time period.

Aspect 12: A method of wireless communication performed by a base station, comprising: transmitting, to a user equipment (UE), physical-layer control information indicating to activate or deactivate a secondary cell; and receiving a communication associated with activating or deactivating the secondary cell within a time period in accordance with the physical-layer control information, wherein the time period is based at least in part on a set of factors and based at least in part on the secondary cell being activated or deactivated by the physical-layer control information.

Aspect 13: The method of aspect 12, wherein the status is a known status, and wherein the secondary cell is associated with the known status based at least in part on the UE having reported a measurement for a synchronization signal block (SSB) for the secondary cell within a time window, the SSB for which the measurement was reported remaining detectable within the time window, and an SSB serving as a quasi-colocation source for the measurement being detectable in the time period.

Aspect 14: The method of any of aspects 12-13, wherein the set of factors includes a frequency range associated with the secondary cell.

Aspect 15: The method of any of aspects 12-14, wherein the set of factors includes a hybrid automatic repeat request timing between receiving a downlink data transmission and acknowledging the downlink data transmission.

Aspect 16: The method of any of aspects 12-15, wherein the set of factors includes a frequency range associated with the secondary cell.

Aspect 17: The method of any of aspects 12-16, wherein the set of factors includes a time at which a first synchronization signal block is received after the physical-layer control information is received by the UE.

Aspect 18: The method of any of aspects 12-17, wherein the set of factors includes respective synchronization signal/physical broadcast channel block measurement timing configurations of a serving cell of the UE and the secondary cell.

Aspect 19: The method of any of aspects 12-18, wherein the set of factors includes a synchronization signal/physical broadcast channel block measurement timing configuration periodicity of the secondary cell.

Aspect 20: The method of any of aspects 12-19, wherein the set of factors includes a measurement delay associated with a physical-layer measurement on the secondary cell.

Aspect 21: The method of any of aspects 12-20, wherein the set of factors includes a slot length of the secondary cell.

Aspect 22: The method of any of aspects 12-21, wherein the communication associated with activating or deactivating the secondary cell within the time period in accordance with the physical-layer control information includes a valid channel state information report received within the time period.

Aspect 23: An apparatus for wireless communication at a device, comprising a processor; memory coupled with the processor; and instructions stored in the memory and executable by the processor to cause the apparatus to perform the method of one or more aspects of aspects 1-22.

Aspect 24: A device for wireless communication, comprising a memory and one or more processors coupled to the memory, the memory and the one or more processors configured to perform the method of one or more aspects of aspects 1-22.

Aspect 25: An apparatus for wireless communication, comprising at least one means for performing the method of one or more aspects of aspects 1-22.

Aspect 26: A non-transitory computer-readable medium storing code for wireless communication, the code comprising instructions executable by a processor to perform the method of one or more aspects of aspects 1-22.

Aspect 27: A non-transitory computer-readable medium storing a set of instructions for wireless communication, the set of instructions comprising one or more instructions that, when executed by one or more processors of a device, cause the device to perform the method of one or more aspects of aspects 1-22.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

receiving physical-layer control information indicating to activate or deactivate a secondary cell; and activating or deactivating the secondary cell within a time period in accordance with the physical-layer control information, wherein the time period is based at least in part on a set of factors and based at least in part on the secondary cell being activated or deactivated by the physical-layer control information, wherein the set of factors includes a status associated with the secondary cell being a known status, wherein the secondary cell is associated with the known status based at least in part on the UE having reported a measurement for a synchronization signal block (SSB) for the secondary cell within a time window, the SSB for which the measurement was reported remaining detectable within the time window, and an SSB serving as a quasi-colocation source for the measurement being detectable in the time period.

2. The method of claim 1, wherein the set of factors includes a frequency range associated with the secondary cell.

3. The method of claim 1, wherein the set of factors includes a hybrid automatic repeat request timing between receiving a downlink data transmission and acknowledging the downlink data transmission.

4. The method of claim 1, wherein the set of factors includes whether the secondary cell is associated with Frequency Range 1 or Frequency Range 2.

5. The method of claim 1, wherein the set of factors includes a time at which a first synchronization signal block is received after the physical-layer control information is received by the UE.

6. The method of claim 1, wherein the set of factors includes respective synchronization signal/physical broadcast channel block measurement timing configurations of a serving cell of the UE and the secondary cell.

7. The method of claim 1, wherein the set of factors includes a synchronization signal/physical broadcast channel block measurement timing configuration periodicity of the secondary cell.

8. The method of claim 1, wherein the set of factors includes a measurement delay associated with a physical-layer measurement on the secondary cell.

9. The method of claim 1, wherein the set of factors includes a slot length of the secondary cell.

10. The method of claim 1, wherein activating or deactivating the secondary cell within the time period in accordance with the physical-layer control information further comprises at least one of:

transmitting a valid channel state information report within the time period, or performing one or more actions related to the physical-layer control information within the time period.

11. A method of wireless communication performed by a network entity, comprising:

transmitting, to a user equipment (UE), physical-layer control information indicating to activate or deactivate a secondary cell; and receiving a communication associated with activating or deactivating the secondary cell within a time period in accordance with the physical-layer control information, wherein the time period is based at least in part on a set of factors and based at least in part on the secondary cell being activated or deactivated by the physical-layer control information, wherein the set of factors includes a status associated with the secondary cell being a known status, wherein the secondary cell is associated with the known status based at least in part on the UE having reported a measurement for a synchronization signal block (SSB) for the secondary cell within a time window, the SSB for which the measurement was reported remaining detectable within the time window, and an SSB serving as a quasi-colocation source for the measurement being detectable in the time period.

12. The method of claim 11, wherein the set of factors includes a frequency range associated with the secondary cell.

13. The method of claim 11, wherein the set of factors includes a hybrid automatic repeat request timing between receiving a downlink data transmission and acknowledging the downlink data transmission.

14. The method of claim 11, wherein the set of factors includes whether the secondary cell is associated with Frequency Range 1 or Frequency Range 2.

15. The method of claim 11, wherein the set of factors includes a time at which a first synchronization signal block is received after the physical-layer control information is received by the UE.

16. The method of claim 11, wherein the set of factors includes respective synchronization signal/physical broadcast channel block measurement timing configurations of a serving cell of the UE and the secondary cell.

17. The method of claim 11, wherein the set of factors includes a synchronization signal/physical broadcast channel block measurement timing configuration periodicity of the secondary cell.

18. The method of claim 11, wherein the set of factors includes a measurement delay associated with a physical-layer measurement on the secondary cell.

19. The method of claim 11, wherein the set of factors includes a slot length of the secondary cell.

20. The method of claim 11, wherein the communication associated with activating or deactivating the secondary cell within the time period in accordance with the physical-layer control information includes a valid channel state information report received within the time period.

21. A user equipment (UE) for wireless communication, comprising:
a memory; and
one or more processors coupled to the memory, the one or more processors configured to:
receive physical-layer control information indicating to activate or deactivate a secondary cell; and
activate or deactivate the secondary cell within a time period in accordance with the physical-layer control information,
wherein the time period is based at least in part on a set of factors and based at least in part on the secondary cell being activated or deactivated by the physical-layer control information,
wherein the set of factors includes a status associated with the secondary cell being a known status, wherein the secondary cell is associated with the known status based at least in part on the UE having reported a measurement for a synchronization signal block (SSB) for the secondary cell within a time window, the SSB for which the measurement was reported remaining detectable within the time window, and an SSB serving as a quasi-colocation source for the measurement being detectable in the time period.

22. The UE of claim 21, wherein the set of factors includes whether the secondary cell is associated with Frequency Range 1 or Frequency Range 2.

23. The UE of claim 21, wherein the set of factors includes a hybrid automatic repeat request timing between receiving a downlink data transmission and acknowledging the downlink data transmission.

24. The UE of claim 21, wherein activating or deactivating the secondary cell within the time period in accordance with the physical-layer control information further comprises at least one of:
transmitting a valid channel state information report within the time period, or
performing one or more actions related to the physical-layer control information within the time period.

25. A network entity for wireless communication, comprising:
a memory; and
one or more processors coupled to the memory, the one or more processors configured to:
transmit, to a user equipment (UE), physical-layer control information indicating to activate or deactivate a secondary cell; and
receive a communication associated with activating or deactivating the secondary cell within a time period in accordance with the physical-layer control information,
wherein the time period is based at least in part on a set of factors and based at least in part on the secondary cell being activated or deactivated by the physical-layer control information,
wherein the set of factors includes a status associated with the secondary cell being a known status, wherein the secondary cell is associated with the known status based at least in part on the UE having reported a measurement for a synchronization signal block (SSB) for the secondary cell within a time window, the SSB for which the measurement was reported remaining detectable within the time window, and an SSB serving as a quasi-colocation source for the measurement being detectable in the time period.

26. The network entity of claim 25, wherein the set of factors includes whether the secondary cell is associated with Frequency Range 1 or Frequency Range 2.

27. The network entity of claim 25, wherein the set of factors includes respective synchronization signal/physical broadcast channel block measurement timing configurations of a serving cell of the UE and the secondary cell.

28. The network entity of claim 21, wherein the set of factors includes a synchronization signal/physical broadcast channel block measurement timing configuration periodicity of the secondary cell.

29. The network entity of claim 21, wherein the set of factors includes a measurement delay associated with a physical-layer measurement on the secondary cell.

30. The network entity of claim 21, wherein the set of factors includes a slot length of the secondary cell.

* * * * *